US005930997A

United States Patent [19]

Hayashi et al.

[11] Patent Number: 5,930,997

[45] Date of Patent: Aug. 3, 1999

[54] DRIVING DEVICE FOR A HYDRAULIC MOTOR

[75] Inventors: Seita Hayashi; Sadao Nunotani; Tosiyuki Akasaka, all of Tochigi-ken, Japan

[73] Assignee: Komatsu Ltd., Tokyo, Japan

[21] Appl. No.: 08/913,717

[22] PCT Filed: Mar. 22, 1996

[86] PCT No.: PCT/JP96/00764

§ 371 Date: Dec. 3, 1997

§ 102(e) Date: Dec. 3, 1997

[87] PCT Pub. No.: WO96/30651

PCT Pub. Date: Oct. 3, 1996

[30] Foreign Application Priority Data

Mar. 24, 1995 [JP] Japan .................................... 7-065718

[51] Int. Cl.$^{6}$ ...................................................... F16D 31/02

[52] U.S. Cl. ................................ 60/468; 60/493; 60/494

[58] Field of Search ............................ 60/468, 494, 493; 91/461

[56] References Cited

U.S. PATENT DOCUMENTS

| | | | |
|---|---|---|---|
| 4,694,647 | 9/1987 | Yoshida | 60/493 X |
| 5,058,383 | 10/1991 | Tsunemi et al. | 60/493 |
| 5,062,266 | 11/1991 | Yoshimatsu | 60/493 X |
| 5,421,156 | 6/1995 | Beater et al. | 60/493 X |
| 5,709,083 | 1/1998 | Sorbel et al. | 60/468 X |

FOREIGN PATENT DOCUMENTS

| | | |
|---|---|---|
| 28 45 922 | 4/1980 | Germany . |
| 54-69676 | 6/1979 | Japan . |
| 56-167903 | 12/1981 | Japan . |
| 60-260703 | 12/1985 | Japan . |
| 4-50507 | 2/1992 | Japan . |
| 4-133003 | 12/1992 | Japan . |

*Primary Examiner*—Hoang Nguyen
*Attorney, Agent, or Firm*—Wenderoth, Lind & Ponack, L.L.P.

[57] ABSTRACT

A hydraulic motor driving apparatus includes a directional control valve for supplying discharge pressure fluid from a hydraulic pump into a first or second port of a hydraulic motor and returning the hydraulic fluid from the second or first port into a tank, and a pilot pressure applying valve for controlling the directional control valve. The directional control valve is urged to its neutral position by springs, to its first position by hydraulic pressure against its first pressure receiving portion and to its second position by hydraulic pressure against its second pressure receiving portion. Discharge pressure fluid from the hydraulic pump is supplied via a check valve into the first and second ports of the hydraulic motor when the directional control valve is at the neutral position. The discharge pressure fluid is supplied into the first port of the hydraulic motor and a hydraulic pressure fluid of the second port flows into the tank, when the directional control valve is at the first position. The discharge pressure fluid is supplied into the second port of the hydraulic motor and hydraulic pressure fluid of the first port flows into the tank, when the directional control valve is at the second position. The pilot pressure applying valve is urged to its neutral position by springs and switched to its first or second position by a first or second drive unit, to apply pilot pressure to the first or second pressure receiving portion of the directional control valve.

10 Claims, 5 Drawing Sheets

DRIVING DEVICE FOR A HYDRAULIC MOTOR

TECHNICAL FIELD

The present invention relates to a hydraulic motor driving apparatus that is adapted to rotationally drive a hydraulic motor, especially but not limited to, a traveling purpose hydraulic motor for a hydraulically driven traveling vehicle in construction machines or the like, by supplying the hydraulic motor with a pressure discharge fluid from a hydraulic pump.

BACKGROUND ART

Where a hydraulic motor is used to drive a traveling body, i. e., a hydraulically driven traveling vehicle, such a traveling purpose hydraulic motor is supplied with a pressure fluid. There, one of the parts of the hydraulic motor is supplied with a discharge pressure fluid from a hydraulic pump where the other or one port thereof is in fluid communication with a tank, to cause the hydraulic motor to be rotationally driven in one rotary direction or the other and then to cause a driving hydraulic fluid to be fed to the vehicle to drive the latter.

By the way, where a hydraulically driven traveling vehicle is traveling downhill, it can happen that the vehicle body may be driven to travel by the weight of the traveling vehicle itself to cause the hydraulic motor to be driven reversely by the vehicle body. Such a situation in which the feed of the driving hydraulic fluid is reversed, if continued, is highly dangerous since the hydraulically driven vehicle will then be moved downhill in an accelerated fashion.

Accordingly, there has been proposed, as disclosed, e. g., in Japanese Unexamined Utility Model Publication No. Hei 4-133003 and Japanese Unexamined Patent Publication No. Hei No. 4-50507, a braking valve called a counterbalance valve which can be switched so that the hydraulic motor may not be rotationally driven when it is reversely driven by an external force such as the weight of the vehicle body itself.

This can be illustrated with reference to FIG. 1 of the drawings attached hereto, which shows a drive circuit for a hydraulic motor, as disclosed in these publications. The drive circuit comprises a hydraulic pump 1, a first and a second main circuit 3 and 4 which are connected to the hydraulic pump 1, and a directional control valve 2 disposed between the hydraulic pump 1 and the first and second main circuits 3, 4 for supplying a discharge pressure fluid from the hydraulic pump 1 to the first and second main circuits 3 and 4 which are connected via a first and a second check valve 5 and 6 to a first and a second port 8 and 9 of a hydraulic motor 7, respectively. The drive circuit for the latter is further provided between the first and second main circuits 3 and 4 with a braking valve 11 that is designed to selectively connect and block a return circuit 12 through which a return fluid from the hydraulic motor 7 is passed to communicate with a tank 10.

And, with the directional control valve 2 at its first position a, if the first main circuit 3 is supplied with the pressure fluid from the hydraulic pump 1, the pressure built up therein (i. e., the driving pressure for the hydraulic motor 7) will cause the braking valve 11 to take its first position b to allow the second port 9 of the hydraulic motor 7 to communicate via the return circuit 12, the braking valve 11 and the directional control valve 2 with the tank 10. A return fluid will thereby be allowed to flow out of the hydraulic motor 7 into the tank 10. Thus, the hydraulic motor 7 is permitted to be rotationally driven in a given direction (as shown by the arrow c) to drive the traveling body.

In the state described above, while the vehicle is traveling downhill, if the hydraulic motor 7 tends to be reversely driven by the vehicle body to rotate in the direction of the arrow c in a runaway manner, it will be caused to undergo a pumping action whereby its first port 8 side has a reduced pressure and its second port 9 side has an elevated pressure. As a result, the first main circuit 3 will be reduced in pressure to cause the braking valve 11 to assume its neutral position e by a pair of springs 13. This will cause the return circuit 12 to be blocked and in turn the hydraulic motor 7 to be braked so as to be stopped.

It should be noted at this point that the case will equally apply where the pressure fluid is supplied into the second main circuit 4 so that the hydraulic motor 7 may be rotationally driven in the direction (indicated by the arrow d) that is opposite to the above described direction.

When such a construction is adopted, the return fluid from the hydraulic motor 7 is allowed to flow via the braking valve 11 and the directional control valve 2, pressure losses will thereby be created in the return fluid while flowing both through the braking valve 11 and through the direction control valve 2 and they will become increasingly greater to the extent to which the pressure at the low pressure side port (i. e., the second port 9 or the first port 8) of the hydraulic motor 7 may be elevated and its pressure difference with the high pressure side port (i. e., the first port 8 or the second port 9) may be reduced. As a consequence, the efficiency of driving the hydraulic motor 7 will be reduced.

Also, for this reason the braking valve 11 must have an increased area of opening through which the return fluid from the hydraulic motor 7 is allowed to flow. This will make it necessary for the braking valve 11 to be increased in size and for its space of installation to be enlarged.

Accordingly, with the above described problems taken into consideration, it is an object of the present invention to provide an improved hydraulic motor driving apparatus which enables a hydraulic motor to be driven at an enhanced efficiency and which allows it to be installed in a reduced space.

SUMMARY OF THE INVENTION

In order to achieve the above mentioned object, there is provided a hydraulic motor driving apparatus which comprises a directional control valve for controlledly supplying a discharge pressure fluid from a hydraulic pump into a first port or a second port of a hydraulic motor and for controlledly returning the hydraulic fluid from the second or first port into a tank, and a pilot pressure applying valve for controlling the directional control valve, and in which:

- the directional control valve is constituted of a pilot pressure switching type valve having a first and a second pressure receiving portion and is adapted to take a neutral position thereof due to a first spring means, to take a first position thereof under a hydraulic pressure applied to the said first pressure receiving portion and to take a second position thereof under a hydraulic pressure applied to the second pressure receiving portion;
- the discharge pressure fluid from the hydraulic pump is supplied via a check valve into the first and second ports of the hydraulic motor when the directional control valve is at the neutral position;
- the discharge pressure fluid from the hydraulic pump is supplied into the first port of the hydraulic motor and a hydraulic pressure fluid of the said second port is allowed to flow out thereof into the tank, when the directional control valve is at the first position;

the discharge pressure fluid from the hydraulic pump is supplied into the second port of the hydraulic motor and a hydraulic pressure fluid of the first port is allowed to flow out thereof into the tank, when the directional control valve is at the second position;

the pilot pressure applying valve is provided with a first and a second drive means and is adapted to take a neutral position thereof due to a second spring means and is adapted to be switched to take a first or a second position thereof with the said first or second drive means, respectively, to apply a pilot pressure to the first or the second pressure receiving portion of the directional control valve;

both of the first and second pressure receiving portions of the directional control valve are brought into fluid communication with the tank when the pilot pressure applying valve is at the neutral position;

the first port of the hydraulic motor is brought into fluid communication with the first pressure receiving portion of the said directional control valve and the second pressure receiving portion is brought into a fluid communication with the tank, when the pilot pressure applying valve is at the first position; and the second port of the hydraulic motor is brought into fluid communication with the second pressure receiving portion of the directional control valve and the first pressure receiving portion is brought into fluid communication with the tank, when the pilot pressure applying valve is at the second position.

According to a construction as described above, it can be seen that since a return from the hydraulic motor is allowed to flow only through the directional control valve, any loss of pressure in a passage for the return fluid will be reduced, thus permitting a hydraulic motor to be driven with an enhanced efficiency.

Also, since the pilot pressure applying valve is allowed to pass only a pilot pressure therethrough and its area of opening is reduced, it can be seen that the pilot pressure applying valve will be rendered compact and reduced in the area of its installation.

By the way, in a construction as described above, it is desirable that there be provided a restriction in each of a first pilot circuit for establishing fluid communication between the first pressure receiving portion of the said directional control valve and the pilot pressure applying valve and a second pilot circuit for establishing a fluid communication between the second pressure receiving portion and the pilot pressure applying valve.

Also, it is desirable that there be a pressure control means responsive to the directional control valve for causing the hydraulic pressure of the discharge fluid of the hydraulic motor to be lowered when the directional control valve is brought to its neutral position and the hydraulic pressure to be elevated when the directional control valve is switched to assume its first or second position.

And, the pressure control means may be provided in a pressure fluid discharge path of the hydraulic motor and constituted with a principal relief valve having a high pressure preset therein and responsive to the directional control valve so as to allow a portion of the discharge pressure fluid in the discharge path to flow out thereof via a restriction into the tank when the directional control valve is switched to its neutral position.

Also, the pressure control means may be provided in a pressure fluid discharge path of the hydraulic motor and constituted with a principal relief valve having a high pressure preset therein and responsive to the directional control valve so as to allow a portion of the discharge pressure fluid in the discharge path to flow into a drain circuit provided with an unload valve having a low preset pressure therein when the directional control valve is switched to its neutral position.

Further, the pressure control means may be provided in a pressure fluid discharge path of the hydraulic motor and constituted with a principal relief valve having a high and a low pressure preset therein which are variably established when a pilot pressure becomes effective and ineffective to a pilot pressure receiving portion of the principal relief valve, respectively, the pilot pressure receiving portion being connected via a shuttle valve to the first and the second ports of the hydraulic motor.

Also, in a construction as described above, it is desirable that:

the directional control valve comprises:

a valve body;

a first, large diameter spool bore formed in the valve body and formed with a pump port, a first actuator port, a second actuator port and a tank port; and a first, large diameter spool slidably inserted in the first, large diameter spool bore and having a first pressure receiving portion and a second pressure receiving portion at its two opposite sides, respectively;

the pilot pressure applying valve comprises:

the valve body;

a second, small diameter spool bore formed in the valve body and formed with with a first port, a second port, a third port, a fourth port and a tank port; and a second, small diameter spool slidably inserted in the second, small diameter spool bore and adapted to be moved slidably therein by a first and a second drive means;

fluid communication is established, each between the first actuator port and the first port, between the second actuator port and the third port, between the second port and the first pressure receiving portion, and between the fourth port and the second pressure receiving portion;

the first spool in the directional control valve be adapted to be brought to its neutral position by the first spring means to block fluid communication between one of the ports and another therein, to be brought to its first position under a fluid pressure applied to the first pressure receiving portion to establish fluid communication each between the pump port and the first actuator port and between the second actuator port and the tank port therein, and to be brought to its second position under a fluid pressure applied to the second pressure receiving portion to establish fluid communication each between the pump port and the second actuator port and between the first actuator port and the tank port therein; and the second spool in the pilot pressure applying valve is adapted be brought to its neutral position by the second spring means to block a fluid communication between the first port and the third port therein and to establish a fluid communication each between the second port and the tank port and between the fourth port and the tank port therein, to be brought to its first position by the first drive means to establish a fluid communication each between the first port and the second port and between the fourth port and the tank port therein, and to be brought to its second portion by the second drive means to establish fluid communication each between the third port and the fourth port and between the second port and the tank port.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a hydraulic motor driving apparatus will be set forth with reference to the accompanying drawings hereof.

Figure 1:
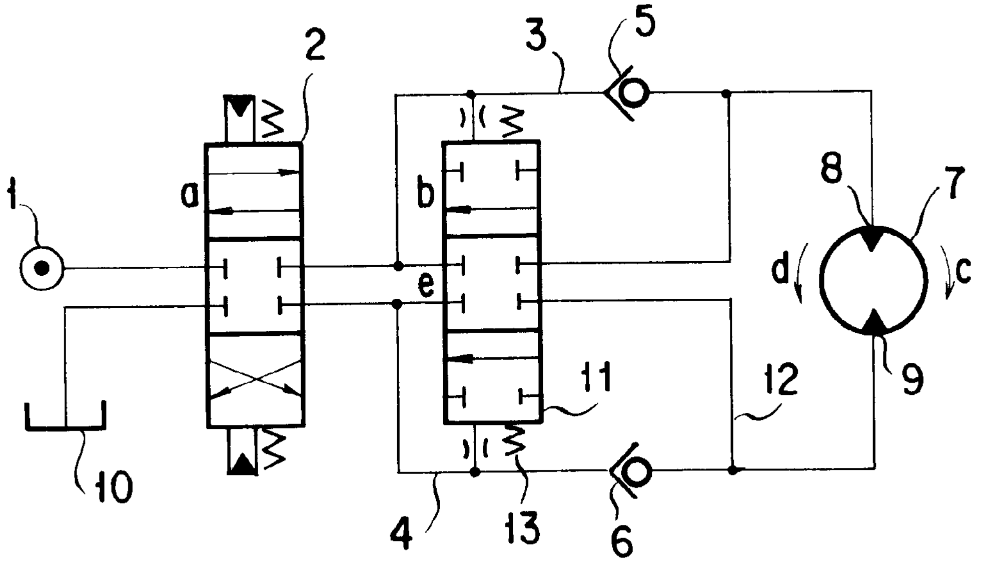
FIG. 1 (PRIOR ART)
FIG. 1 is a circuit diagram of a hydraulic drive circuit in the prior art for a hydraulic motor.
Figure 2:
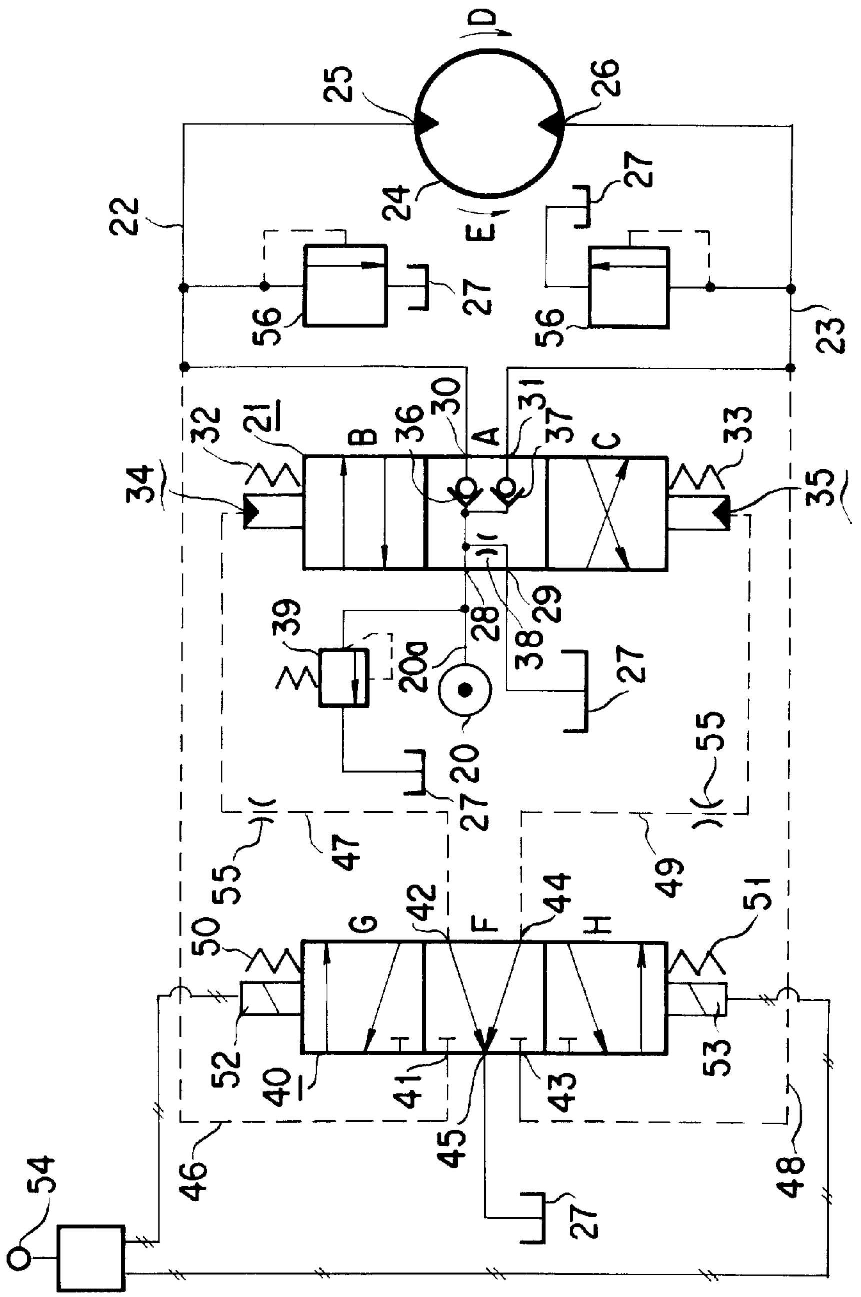
FIG. 2 is a circuit diagram of a hydraulic drive circuit according to a first embodiment of a hydraulic motor driving apparatus according to the present invention.

FIG. 2 depicts a hydraulic circuit diagram that represents a first embodiment of the present invention. As illustrated in FIG. 2, a pressure fluid discharged from a hydraulic pump 20 is supplied through a directional control valve 21 into a first and a second main circuit 22 and 23 which are connected to a first port 25 and a second port 26 of a hydraulic motor 24, respectively. Also, a discharge path 20*a* of the hydraulic pump 20 is connected to a tank 27 via a principal relief valve 39.

The directional control valve 21 described above is provided with a pump port 28, a tank port 29, and a first and a second actuator port 30 and 31. The pump port 28 is connected to the discharge path 20*a* of the hydraulic pump 20, the tank port 29 is connected to the tank, the first actuator port 30 is connected to the first main circuit 22, and the second actuator port 31 is connected to the second main circuit 23.

The directional control valve 21 described above is of a pilot pressure switching type in that it may be held at its neutral position A by pair of springs 32 and 33, may be switched to its first position B under a fluid pressure applied at its first pressure receiving portion 34 and may be switched to its second position C under a fluid pressure applied at its second pressure receiving portion 35.

When the directional control valve 21 is held at its neutral position A, the pump port 28 will be in fluid communication with both the first and second actuator ports 30 and 31 via a first and a second check valve 36 and 37, respectively, and also is in fluid communication with the tank port 29 via a restriction 38.

Since the discharge pressure fluid of the hydraulic pump 20 is thus allowed to flow via the restriction 38 into the tank 27 when the directional control valve 21 is at the neutral state A, it will have a low pressure that is not affected by the principal relief valve 39 but is determined by the restriction 38. And, with this low pressure being applied to the first and second main circuits 22 and 23 via the first and second check valves 36 and 37, the pressure fluid in either the first or the second main circuit 22 or 23 will be blocked from flowing towards the pump port 28 by the first and second check valves 36 and 37, and thus the hydraulic motor 24 is held not in a non-rotary state if an external force is exerted thereon.

Also, when the directional control valve 21 is switched to the first position B, the pump port 28 will be brought into fluid communication with the first actuator port 30, and the tank port 29 will be brought into fluid communication with the second actuator port 31.

Since the state is brought about thereby in which, with the directional control valve 21 held at its first position B, the discharge pressure fluid from the hydraulic pump 20 is allowed to flow through the first main circuit 22 into the first port 25 of the hydraulic motor 24 and the pressure fluid from its second port 26 (the return fluid) is allowed to flow out thereof through the second main circuit 23 and the directional control valve 21 into the tank 27, the hydraulic motor 24 will be rotationally driven in one given rotary direction (shown by the arrow D).

Also, when the directional control valve 21 is switched to its second position C, the pump port 28 will be brought into fluid communication with the second actuator port 31 and the tank port 29 will be brought into fluid communication with the first actuator port 30.

Since the state is thereby brought about in which, with the directional control valve 21 held at its second position C, the discharge pressure fluid from the hydraulic pump 20 is allowed to flow through the second main circuit 23 into the second port 26 of the hydraulic motor 24 and the pressure fluid from its first port 25 (the return fluid) is allowed to flow out thereof through the first main circuit 22 and the directional control valve 21 into the tank 27, the hydraulic motor 24 will be rotationally driven in the other given rotary direction (shown by the arrow E).

It should be noted at this point that if the principal relief valve 39 described above is given a pressure that exceeds a maximum pressure utilized to drive the hydraulic motor 24, it will then operate in a relief mode. Since the fluid communication between the pump port 28 and the tank port 29 is blocked with directional control valve 21 brought to assume its first position B or second position C, it will be seen that the driving pressure for the hydraulic motor 24 can then be built up to a maximum level that has been established at the principal relief valve 39.

It can also be seen that the pilot pressure applying valve 40 will act to allow the pressures in the first and second main circuits 22 and 23 (i. e., the hydraulic motor driving pressures) to be applied, respectively, to the first and second pressure receiving portions 34 and 35 described above of the directional control valve 21.

The pilot pressure applying valve 40 described above is provided with a first port 41, a second port 42, a third port 43, a fourth port 44 and a tank port 45. The first port 41 is connected via a first pilot circuit 46 to the first main circuit 22, the second port 42 is connected via a second pilot circuit 47 to the first pressure receiving portion 34, the third port 43 is connected via a third pilot circuit 48 to the second main circuit 23, the fourth port 44 is connected via fourth pilot circuit 49 to the second pressure receiving portion 35, and the tank port 45 is connected to the tank 27. It may be noted also that there is provided a restriction 55 in each of the second and fourth pilot circuits 47 and 49.

The pilot pressure applying valve 40 is here of an electromagnetically switching type and it may be held at its neutral position by a first and a second spring 50 and 51, it may be switched to assume its first position G with a first solenoid 52 electrically energized and it may be switched to assume its second position H with a second solenoid 53 electrically energized. Each of the first and second solenoids 52 and 53 is adapted to be energized with an electric current by means of an operating unit 54 being acted upon.

It should be noted here that the pilot pressure applying valve 40 alternatively may be of a manually switching type in which it can be switched by a manual operation to assume its first and second positions G and H, or may be of a pilot pressure switching type in that it can be switched likewise by another pilot pressure.

When the pilot pressure applying valve 40 is held at its neutral position F, the first port 41 and the third port 43 will each be blocked whereas the second port 42 and the fourth port 44 will each be in fluid communication with the tank port 45. Since the pressures at the first and second pressure receiving portions 34 and 35 of the directional control valve 21 are thus each relieved into the tank 27, the directional control valve 21 will then be switched to its neutral position A.

Then, with the second and fourth pilot circuits 47 and 49 being each provided with the restriction 55, it can be seen that since the pressure fluid at each of the pressure receiving portions 34 and 35 is allowed to slowly flow out thereof into the tank 27, the directional control valve 21 will be slowly switched from its first position B or second position C. This ensures that at no time will the hydraulic motor 24 be braked and cease rotating suddenly when the pilot pressure applying valve 40 is held at its neutral position F.

Also, when the pilot pressure applying valve 40 is switched to its first position G, the first port 41 and the second port 42 will be allowed to communicate with each other, the fourth port 44 and the tank port 45 will be allowed to communicate with each other, and the third port 43 will be blocked.

Then, a state will be thereby brought about in which, with the pilot pressure applying valve 40 held to assume its first position G, the pressure in the first main circuit 22 will be applied to the first pressure receiving portion 34 and the pressure at the second pressure receiving portion 35 will be relieved into the tank 27, thus causing the directional control valve 21 to be switched to its first position B.

Also, when the pilot pressure applying valve 40 is switched to its second position H, the third port 43 and the fourth port 44 will be allowed to communicate with each other, the second port 42 and the tank port 45 will be allowed to communicate with each other, and the first port 41 will be blocked.

Then, a state will be thereby brought about in which with the pilot pressure applying valve 40 held to assume its second position H, the pressure in the second main circuit 23 will be applied to the second pressure receiving portion 35 and the pressure at the first pressure receiving portion 34 will be relieved into the tank 27, thus causing the directional control valve 21 to be switched to its second position C.

Now, an explanation will be given with respect to an operation of the present embodiment of the invention.

When the Pilot Pressure Applying Valve 40 is at its Neutral Position F

With the pressure at both the first and second pressure receiving portions 34 and 35 being relieved into the tank 27 to switch the directional control valve 21 to its neutral position A, the discharge pressure fluid from the hydraulic pump 20 will be supplied into the first and second main circuits 22 and 23 and will then be at a low pressure determined by the restriction 38.

When the Pilot Pressure Applying Valve 40 is at its First Position G

With the pressure in the first main circuit 22 being applied as a pilot pressure to the first pressure receiving portion 34 to cause the directional control valve 21 to be switched to its first position B, the discharge pressure fluid from the hydraulic pump 20 will be supplied into the first main circuit 22 and the pressure fluid in the second main circuit 23 will be allowed to flow into the tank 27. As a result, the hydraulic motor 24 will be rotationally driven in the one rotary direction (shown by the arrow D).

When the Pilot Pressure Applying Valve 40 is at its Second Position H

With the pressure in the second main circuit 23 being applied as a pilot pressure to the second pressure receiving portion 35 to cause the directional control valve 21 to be switched to its second position C, the discharge pressure fluid from the hydraulic pump 20 will be supplied into the second main circuit 23 and the pressure fluid in the first main circuit 22 will be allowed to flow into the tank 27. As a consequence, the hydraulic motor 24 will be rotationally driven in the other rotary direction (shown by the arrow E).

In the Situation Where the Hydraulic Motor 24 Which has been Rotationally Driven in One Rotary Direction is Driven in the Same Rotary Direction, Reversely by an External Force Since the hydraulic motor 24 is driven in the one rotary direction, reversely by an external force, there will be created there a pumping action to cause the pressure in its first port 25 to be reduced and the pressure in its second port 26 to be elevated, thus causing the pressure in the first main circuit 22 to be reduced to a level (substantially zero) that is lower than the pressure which is determined by the restriction 38.

Then, a state will be thereby brought about in which, as the pilot pressure at the first pressure receiving portion 34 is reduced, the directional control valve 21 is switched to its neutral position A by the second spring 33. Since the second check valve 37 then acts to prevent the pressure fluid in the second main circuit 23 from flowing into the tank 27, it follows that the hydraulic motor 24 will be braked to cease rotating.

In the Situation Where the Hydraulic Motor 24 Which has been Rotationally Driven in the Other Rotary Direction is Driven in the Same Rotary Direction, Reversely by an External Force Since the hydraulic motor 24 is driven in the other rotary direction, reversely by an external force, there will be created there a pumping action to cause the pressure in its second port 26 to be reduced and the pressure in its first port 25 to be elevated, thus causing the pressure in the second main circuit 23 to be reduced to a level (substantially the zero) that is lower than the pressure which is determined by the restriction 38.

Then, a state will be thereby brought about in which, as the pilot pressure at the second pressure receiving portion 35 is reduced, the directional control valve 21 is switched to its neutral position A by the first spring 32. Since the first check valve 36 then acts to prevent the pressure fluid in the first main circuit 22 from flowing into the tank 27, it follows that the hydraulic motor 24 will be braked to cease rotating.

In the embodiment described above, it may be noted that when the hydraulic motor 24 is driven reversely by an external force to restore the directional control valve 21 to its neutral position A, there could be a fear that the pressure in the first or second main circuit 22 or 23 might be excessively elevated to cause a damage in the instruments associated therewith. Then, as shown in FIG. 2, there should preferably be provided a safety valve 56 in each of the first and second main circuits 22 and 23. Then, the safety valve 56 should have a preset pressure level that is higher than the preset pressure level for the principal relief valve 39.

Next, an explanation will be given with respect to a certain specific structure in which the directional control valve 21 and the pilot pressure applying valve 40 are incorporated in a preferred combination.

Figure 3:
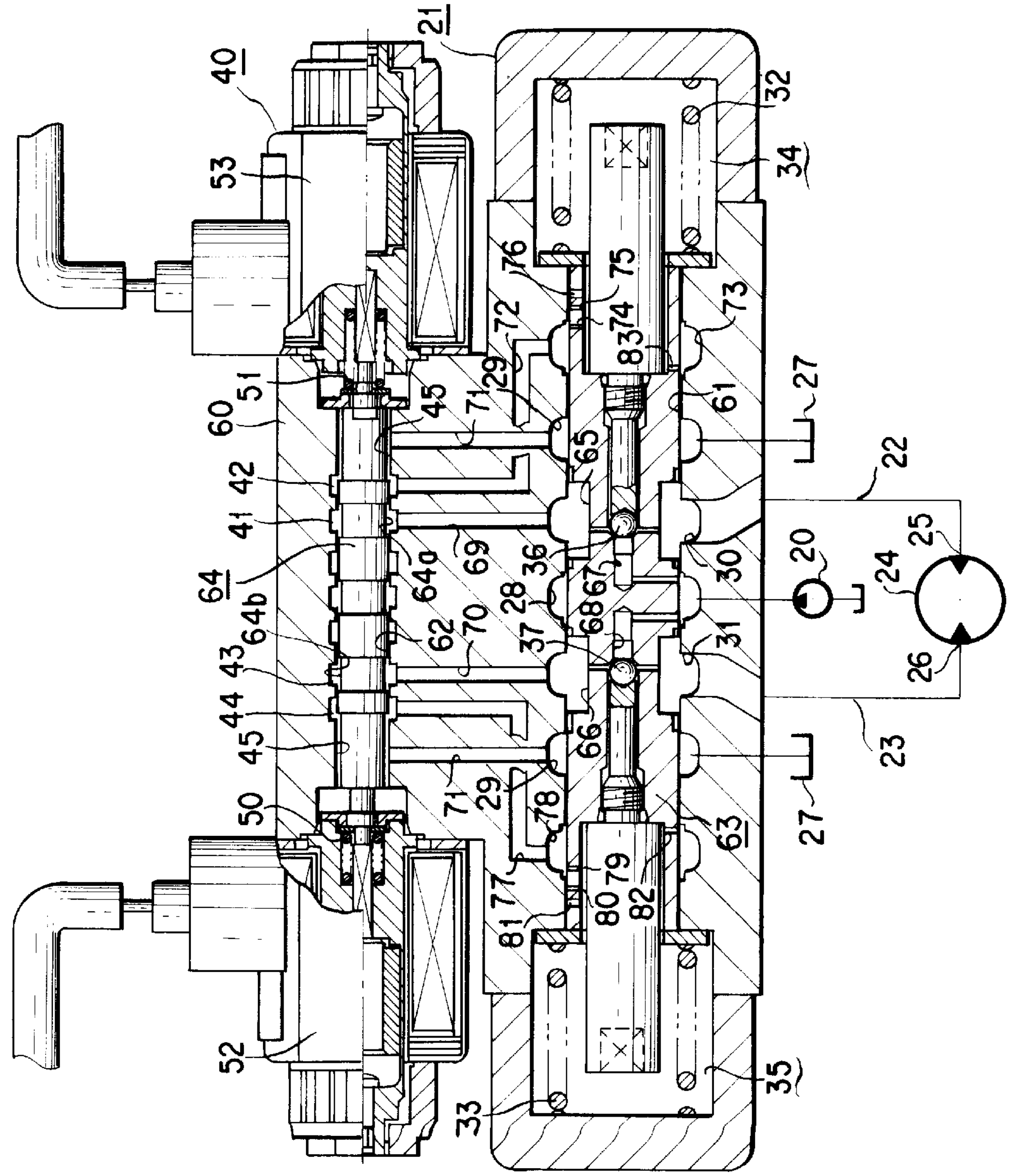
FIG. 3 is a cross sectional view that shows a specific structure of a directional control valve and a pilot pressure applying valve in combination in an apparatus according to the present invention.

As shown in FIG. 3, a valve body 60 is formed therein with a first, large diameter spool bore 61 and a second, small diameter spool bore 62. The first spool bore 61 is formed with the various ports of the directional control valve 21, and has a first, large diameter spool 63 slidably inserted therein for establishing and blocking fluid communication between these ports, thus constituting the directional control valve 21. The second spool bore 62 is formed with the various ports of the pilot pressure applying valve 40, and has a second, small diameter spool 64 slidably inserted therein for establishing and blocking fluid communications between these ports, thus constituting the pilot pressure applying valve 40.

The first spool 63 is formed thereon with a first small diameter portion 65 and a second small diameter portion 66. The first small diameter portion 65 is formed to communicate directly with the first actuator port 30 and to communicate via a first fluid bore 67 with the pump port 28. Further, the first check valve 36 is provided in the first fluid bore 67.

The second small diameter portion 66 described above is formed to communicate directly with the second actuator port 31 and to communicate via a second fluid bore 68 with the pump port 28. Further, the second check valve 37 is provided in the second fluid bore 68.

The first actuator port 30 is formed to communicate via a first fluid communication bore 69 with the first port 41, the second actuator port 31 is formed to communicate via a second fluid communication bore 70 with the third port 43, and the tank port 29 disposed at the left hand side and the tank port 29 disposed at the right hand side are formed to communicate via a left hand side and a right hand side communication bore 71 and 71, respectively, with a pair of interstices between the second spool bore 62 and the second spool 64 at the left hand side and the right hand side (which form the tank port 45 at the left hand side and the tank port 45 at the right hand side).

The second port 42 is formed to communicate via a fourth communication bore 72 with a first auxiliary port 73 in the first spool bore 61, the first auxiliary port 73 is formed to communicate via a first, a second and a third fine bore 74, 75 and 76 formed in the first spool 63 in succession with the first pressure receiving portion 34, where the first, second and third fine bores 74, 75 and 76 correspond to the restriction 55 which is shown in FIG. 2 as provided in the second pilot circuit 47.

The fourth port 44 is formed to communicate via a fifth communication bore 77 with a second auxiliary port 78 in the first spool bore 61, the second auxiliary port 78 is formed to communicate via a fourth, a fifth and a sixth fine bore 79, 80 and 81 formed in the first spool 63 in succession with the second pressure receiving portion 35, where the fourth, fifth and sixth fine bores 79, 80 and 81 correspond to the restriction 55 which is shown in FIG. 2 as provided in the fourth pilot circuit 49.

An explanation will next be given with respect to an operation of the above described specific structural part.

When neither the first solenoid 52 nor the second solenoid 53 is energized with an electric current, the second spool 64 will be balanced by the first and second springs 50 and 51 to assume its neutral position shown (i. e., the neutral position F in FIG. 2). Then, both the first port 41 and the third port 43 will be blocked, the second port 42 will be allowed to communicate via the right hand side tank port 45, the right hand side third communication bore 71 and the right hand side tank port 29 with the tank 27, and the fourth port 44 will be allowed to communicate via the left hand side tank port 45, the left hand side third communication port 71 and the left hand side tank port 29 with the tank 27.

This will cause the first pressure receiving portion 34 to communicate via the first fine bore 74, the first auxiliary port 73, the right hand side fourth communication port 72 and the second port 42 with the tank 27, the second pressure receiving portion 35 to communicate via the fourth fine bore 79, the second auxiliary port 78, the left hand side fifth communication bore 77 and the fourth port 44 with the tank 27. As a consequence, the first spool 63 will take its neutral position as shown (i. e., the neutral position A in FIG. 2).

If the first solenoid 52 is electrically energized to displace the second spool 64 rightwards from its neutral position as shown, the first port 41 and the second port 42 will communicate with each other via the first small diameter portion 64*a* and the fourth port 44 will be brought into a fluid communication with the left hand side tank port 45. Then, the pilot pressure applying valve 50 will be switched to assume it first position G shown in FIG. 2.

Since this causes the first pressure receiving portion 34 to be supplied with the pressure fluid of the first actuator port 30 to thrust the first spool 63 leftwards, the pump port 28 will be brought into fluid communication with the first actuator port 30 via the first small diameter portion 65, and the second actuator port 31 will be brought into fluid communication with the tank port 29 via the second small diameter portion 66, thereby switching the directional control valve 21 to assume its first position B as shown in FIG. 2. As a consequence, the hydraulic motor 24 will be rotationally driven in the one rotary direction. Then, the first, second and third fine bores 74, 75 and 76 would have been in a fluid communication with the first auxiliary port 73. It should be noted here that when the first spool 63 is displaced leftwards, the pressure fluid in the second pressure receiving portion 35 will be allowed to flow out thereof into the tank 27 via the left hand side fine bore 82 formed in the first spool 63 and the second auxiliary port 78.

If the hydraulic motor 24 in the state described earlier is driven, reversely by an external force, in the same direction with the result that the pressure in the first main circuit 22 is lowered, the pressure within the first pressure receiving portion 34 will be reduced as well. Since the first spool 63 is thus thrusted by the second spring 33 rightwards to restore its neutral position (i. e., a neutral position A as shown in FIG. 2), the communication between the second actuator port 31 and the left hand side tank port 29 will then be blocked, thus preventing the pressure fluid in the second main circuit 23 from flowing out thereof into the tank 27. Thence, the hydraulic motor 24 will be braked and cease rotating.

Also, if the first solenoid 52 is demagnetized in the state in which the hydraulic motor 24 described earlier is rotationally driven in the one direction, the second spool 64 will be restored by means of the second spring 51 to its neutral position (i. e., a neutral position F as shown in FIG. 2). Then, since the fluid communication between the first port 41 and the second port 42 is blocked and the second port 42 is brought into fluid communication with the tank port 45, the pressure fluid within the first pressure receiving portion 34 will be allowed to flow out thereof into the tank 27 via the first, second and third fine bores 74, 75 and 76. As a result, the first spool 63 will be thrusted by the second spring 33 and then displaced towards its neutral position, thus blocking the third fine bore 76. A further displacement thereof will block the second fine bore 72 and eventually the first spool 63 will be restored to its neutral position.

Because in the course of restoration of the first spool 63 to its neutral position the area of opening between the first pressure receiving portion 34 and the tank 27 is progressively reduced as a function of the distance of its displacement in this manner, the first spool 63 will be restored slowly to the neutral position. As a result, the hydraulic motor 24 being allowed to slowly cease rotating, the shock that it should suffer when it is stopped will drastically be reduced.

If the second solenoid 53 is energized with an electric current so that the second spool 64 may be displaced leftwards, the third port 43 and the fourth port 44 will be allowed to communicate with each other via the second small diameter portion 64*b* of the second spool 64 and the second port 42 will be brought into communication with the right hand side tank port 45. Then, the pilot pressure applying valve 40 will thereby be switched to its second position H as shown in FIG. 2.

Since this causes the second pressure receiving portion 35 to be supplied with the pressure fluid of the second actuator port 31 to thrust the first spool 63 rightwards, the pump port 28 will be brought into fluid communication with the second actuator port 3 via the second small diameter portion 66 and the first actuator port 30 will be brought into fluid communication with the tank port 29 via the first small diameter portion 65, thereby switching the directional control valve 21 to assume its second position C as shown in FIG. 2. As a consequence, the hydraulic motor 24 will be rotationally driven in the other rotary direction. Then, the fourth, fifth and sixth fine bores 79, 80 and 81 would have been in a fluid communication with the second auxiliary port 78. It should be noted here that when the first spool 63 is displaced rightwards, the pressure fluid in the first pressure receiving portion 34 will be allowed to flow out thereof into the tank 27 via the right hand side fine bore 83 formed in the first spool 63 and the first auxiliary port 73.

If the hydraulic motor 24 in the state described earlier is driven, reversely by an external force, in the same direction with the result that the pressure in the second main circuit 23 is lowered, the pressure within the second pressure receiving portion 35 will be reduced as well. Since the first spool 63 is thus thrusted by the first spring 32 leftwards to restore its neutral position (i. e., a neutral position A as shown in FIG. 2), the communication between the first actuator port 30 and the right hand side tank port 29 will then be blocked, thus preventing the pressure fluid in the first main circuit 22 from flowing out thereof into the tank 27. Thence, the hydraulic motor 24 will be braked and cease rotating.

Also, if the second solenoid 53 is demagnetized in the state in which the hydraulic motor 24 described earlier is rotationally driven in the other direction, the second spool 64 will be restored by means of the first spring 50 to its neutral position (i. e., a neutral position F as shown in FIG. 2). Then, since the fluid communication between the third port 43 and the fourth port 44 is blocked and the fourth port 44 is brought into fluid communication with the tank port 45, the pressure fluid within the second pressure receiving portion 35 will be allowed to flow out thereof into the tank 27 via the fourth, fifth and sixth fine bores 79, 80 and 81. As a result, the first spool 63 will be thrusted by the first spring 32 and then displaced towards its neutral position, thus blocking the sixth fine bore 81. A further displacement thereof will block the fifth fine bore 80 and eventually the first spool 63 will be restored to its neutral position.

Because in the course of restoration of the first spool 63 to its neutral position the area of opening between the second pressure receiving portion 35 and the tank 27 is progressively reduced as a function of the distance of its displacement in this manner, the first spool 63 will be restored slowly to the neutral position. As a result, the hydraulic motor 24 being allowed to slowly cease rotating, the shock that it should suffer when it is stopped will drastically be reduced.

Also, because the pilot pressure applying valve 40 requires only a small amount of the pressure fluid to be passed that is just sufficient to generate a pilot pressure, each of the areas of openings between the first port 41 and the second port 42, between the second port 42 and the tank port 45, between the third port 43 and the fourth port 44 and between the fourth port 44 and the tank port 45, which may be created by the second spool 64, can be minimized, and the second spool 64 can then be also minimized in its diameter, it will be seen that the pilot pressure applying valve 40 could be rendered compact.

Figure 4:
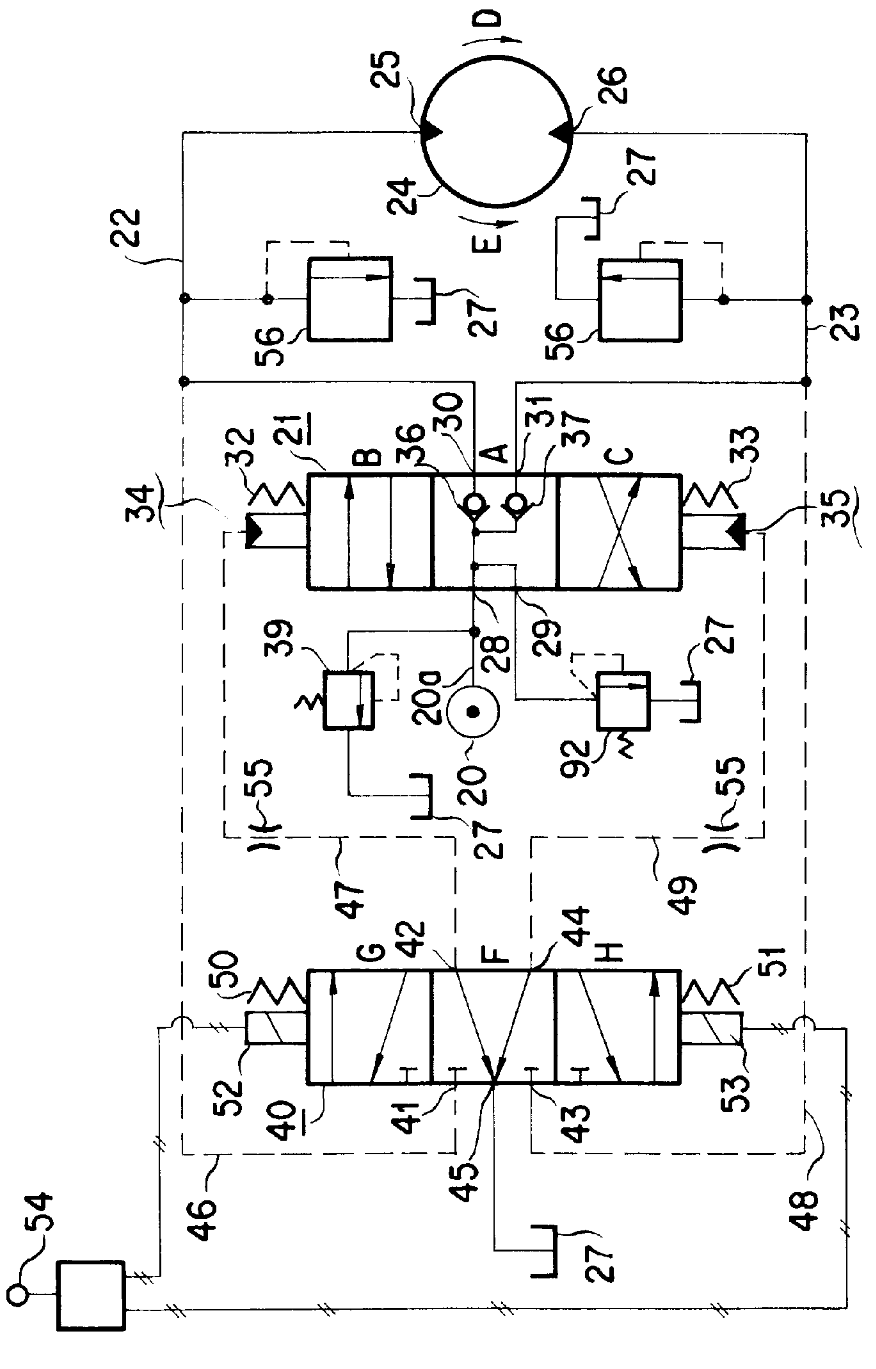
FIG. 4 is a circuit diagram of a hydraulic drive circuit according to a second embodiment of a hydraulic motor driving apparatus according to present invention.
Figure 5:
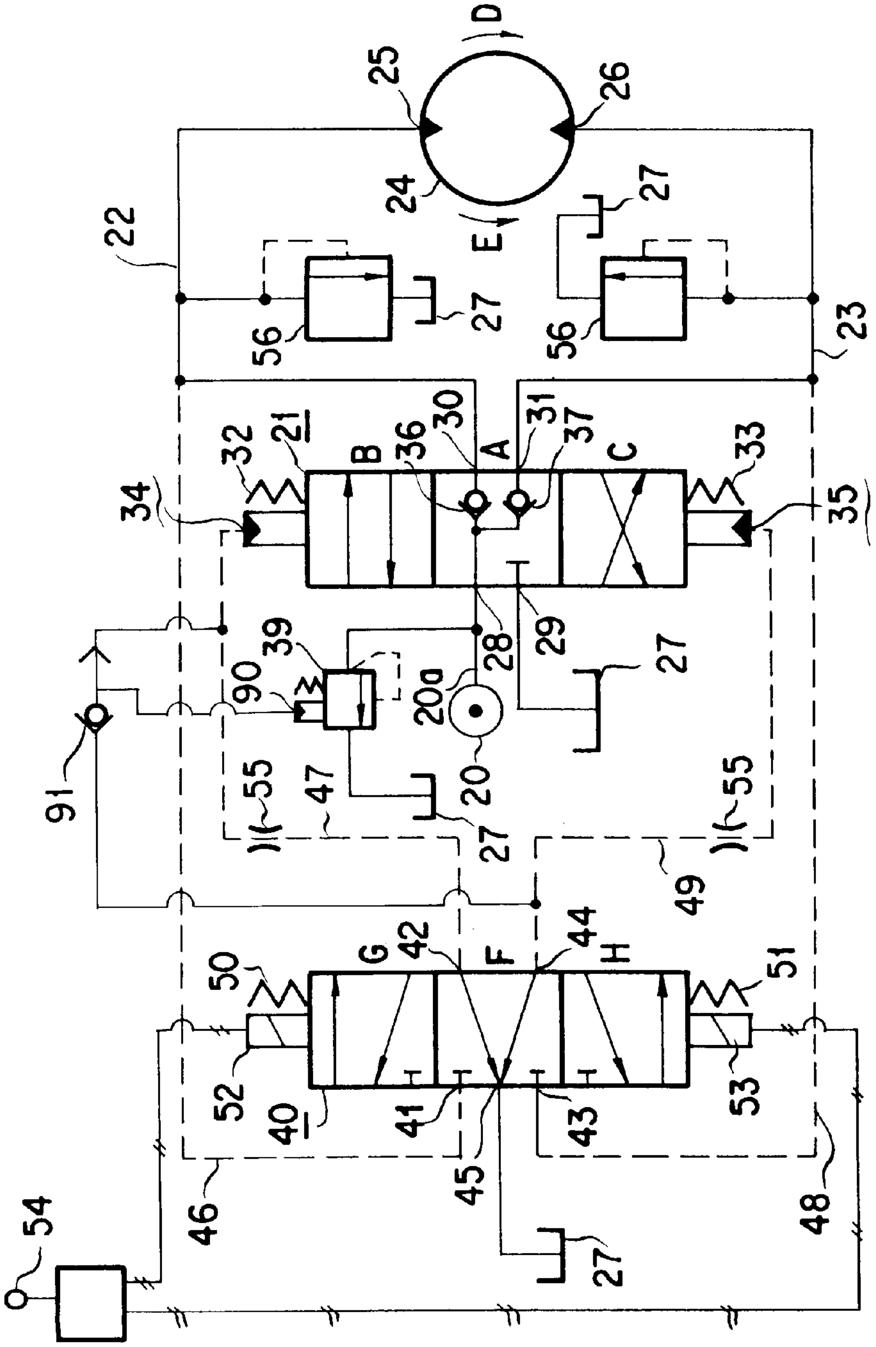
FIG. 5 is a circuit diagram of a hydraulic drive circuit according to a third embodiment of the hydraulic motor driving apparatus according to present invention.

Also, it may be seen that while in the specific structural embodiment described above there is formed no fluid passage which may establish a fluid communication from the pump port 28 via the restriction 38 to the tank port 29 when the directional control valve 21 is switched to the neutral position A, this may as needed be provided by adopting an arrangement as shown in FIG. 4 or 5.

For example, as in the second embodiment shown in FIG. 4, it should be noted that for use in the case in which the directional control valve 21 is held at the neutral position A, a direct fluid communication may be established between the pump port 28 and the tank port 29 whereas there may be provided an unload valve 92 that is disposed at a location between the tank port 29 and the tank 27 and adapted to be unloaded in response to a reduced pressure thereat, for causing the pressure of the discharge fluid of the hydraulic pump 20 to be reduced when the directional control valve 21 is at the neutral position A and to be elevated up to the preset pressure for the principal relief valve 39 when the directional control valve 21 is switched to the first position B or the second position C.

The arrangement of FIG. 5 may be adopted, in which when the directional control valve 21 is set at the neutral position A, the fluid communication between the pump port 28 and the tank port 29 is blocked and the principal relief valve 39 can then be a variable relief valve in which, if a pressure is applied to a pressure receiving portion 90, it will have a high preset pressure level and, if otherwise, it will have a low preset pressure level. In addition, there is applied to the pressure receiving portion 90 via a shuttle valve 91 a pilot pressure that is effective in the second pilot circuit 47 or the fourth pilot circuit 49.

If such a construction is adopted, it follows that when the directional control valve 21 is set at the neutral position A there will be no pressure applied to the pressure receiving portion 90 of the principal relief valve 39. Since the principal relief 39 should then have the low preset pressure level, the pressure of the discharge fluid from the hydraulic pump 20 will be reduced. When the directional control valve 21 is switched to the first position B or the second position C, the application of a pressure to the pressure receiving portion 90 of the principal relief valve 39 will cause the latter to establish its elevated preset pressure level and the pressure of the discharge fluid from the hydraulic pump 20 to be elevated.

As set forth in the foregoing description, it can be seen that according to the present invention in which a return fluid from the hydraulic motor 24 is allowed to flow into the tank 27 only through the directional control valve 21, any pressure loss whatsoever in the flow path for the return fluid will be reduced, thus permitting the hydraulic motor 24 to be driven with an enhanced efficiency.

Also, because of its unique function of exclusively permitting a pilot pressure to be passed therethrough and because of its reduced area of opening that thus ensues, it can be seen that the pilot pressure applying valve 40 will be rendered compact and reduced in its area of installation.

Also, the directional control valve 21 herein is designed to be switched to its first position and its second position under the pressures at the first port 25 and at the the second port 26 of the hydraulic motor 24, respectively. Accordingly, when hydraulic motor 24 is driven reversely by an external force, it can be seen that the pressure at its first port 25 or at its second port 26 will be allowed to drop, thereby restoring the directional control valve 21 to its neutral position. As a consequence, the check valve 36, 37 can be provided to prevent the pressure fluid from flowing out of the first port 25 or the second port 26 into the tank 27, hence permitting the hydraulic motor 24 to be braked and thus cease rotating.

And, since the pressure fluid in the first pressure receiving portion 34 or the second pressure receiving portion 35 is here allowed to flow slowly out thereof into the tank 27 via the restriction 55 when the directional control valve 21 is to be restored to its neutral position from its first or second position, it follows that the valve 21 can be restored slowly to the neutral position, thus permitting the hydraulic motor 24 to slowly cease rotating.

Further, there is further provided a pressure control means that allows the discharge pressure fluid from the hydraulic pump 20 to be reduced when the directional control valve 21 is set at the neutral position and to be elevated when it is set to the first or second position. Any loss of the driving horse power which may ensue when the directional control valve is held at its neutral position can be drastically reduced. Also, the pressures both at the first port 26 and at the second port 26 of the hydraulic motor 24 which are effectively present when the directional control valve 21 is set at the neutral position can be utilized effectively as a pilot pressure such as to switch the directional control valve 21 to both the first and second positions, respectively.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

What is claimed is:

1. A hydraulic motor driving apparatus which comprises a directional control valve for controlledly supplying a discharge pressure fluid from a hydraulic pump into a first port or a second port of a hydraulic motor and for controlledly returning the hydraulic fluid from the second or first port into a tank, and a pilot pressure applying valve for controlling the directional control valve, and in which:

said directional control valve is constituted of a pilot pressure switching type valve having a first and a second pressure receiving portion and is adapted to take a neutral position thereof due to a first spring means, to take a first position thereof under a hydraulic pressure applied to said first pressure receiving portion and to take a second position thereof under a hydraulic pressure applied to said second pressure receiving portion;

the discharge pressure fluid from said hydraulic pump is supplied via a check valve into the first and second ports of said hydraulic motor when said directional control valve is at said neutral position;

the discharge pressure fluid from said hydraulic pump is supplied into the first port of said hydraulic motor and a hydraulic pressure fluid of said second port is allowed to flow out thereof into the tank, when said directional control valve is at said first position;

the discharge pressure fluid from said hydraulic pump is supplied into the second port of said hydraulic motor and a hydraulic pressure fluid of said first port is allowed to flow out thereof into the tank, when said directional control valve is at said second position;

said pilot pressure applying valve is provided with a first and a second drive means and is adapted to take a neutral position thereof due to a second spring means and is adapted to be switched to take a first or a second position thereof with said first or said second drive means, respectively, to apply a pilot pressure to the first or the second pressure receiving portion of said directional control valve;

both of the first and second pressure receiving portions of said directional control valve are brought into fluid communication with the tank when said pilot pressure applying valve is at said neutral position;

the first port of said hydraulic motor is brought into fluid communication with the first pressure receiving portion of said directional control valve and said second pressure receiving portion is brought into fluid communication with the tank, when said pilot pressure applying valve is at said first position; and the second port of said hydraulic motor is brought into fluid communication with the second pressure receiving portion of said directional control valve and said first pressure receiving portion is brought into fluid communication with the tank, when said pilot pressure applying valve is at said second position.

2. A hydraulic motor driving apparatus, as set forth in claim 1, in which a restriction is provided in each of a first pilot circuit for establishing fluid communication between the first pressure receiving portion of said directional control valve and said pilot pressure applying valve and a second pilot circuit for establishing fluid communication between said second pressure receiving portion and said pilot pressure applying valve.

3. A hydraulic motor driving apparatus, as set forth in claim 1, which further comprises a pressure control means responsive to said directional control valve for causing the hydraulic pressure of the discharge fluid of said hydraulic motor to be lowered when said directional control valve is brought to said neutral position and said hydraulic pressure to be elevated when said directional control valve is switched to take said first or second position.

4. A hydraulic motor driving apparatus, as set forth in claim 3, in which said pressure control means is provided in a pressure fluid discharge path of said hydraulic motor and constituted with a principal relief valve having a high pressure preset therein and responsive to said directional control valve so as to allow a portion of the discharge pressure fluid in said discharge path to flow out thereof via a restriction into the tank when said directional control valve is switched to said neutral position.

5. A hydraulic motor driving apparatus, as set forth in claim 3, in which said pressure control means is provided in a pressure fluid discharge path of said hydraulic motor and constituted with a principal relief valve having a high pressure preset therein and responsive to said directional control valve so as to allow a portion of the discharge pressure fluid in said discharge path to flow into a drain circuit provided with an unload valve having a low preset pressure therein when said directional control valve is switched to said neutral position.

6. A hydraulic motor driving apparatus, as set forth in claim 3, in which said pressure control means is provided in a pressure fluid discharge path of said hydraulic motor and constituted with a principal relief valve having a high and a low pressure preset therein which are variably established when a pilot pressure becomes effective and ineffective to a pilot pressure receiving portion of said principal relief valve, respectively, and said pilot pressure receiving portion is connected via a shuttle valve to the first and the second ports of said hydraulic motor.

7. A hydraulic motor driving apparatus, as set forth in claim 1, in which:

said directional control valve comprises:

a valve body;

a first, large diameter spool bore formed in said valve body and formed with a pump port, a first actuator port, a second actuator port and a tank port; and a first, large diameter spool slidably inserted in said first, large diameter spool bore and having a first pressure receiving portion and a second pressure receiving portion at its two opposite sides, respectively;

said pilot pressure applying valve comprises:

the valve body;

a second, small diameter spool bore formed in said valve body and formed with a first port, a second port, a third port, a fourth port and a tank port; and a second, small diameter spool slidably inserted in said second, small diameter spool bore and adapted to be moved slidably in said second spool bore by the first and the second drive means;

fluid communication may be established, each between said first actuator port and said first port, between said second actuator port and said third port, between said second port and said first pressure receiving portion, and between said fourth port and said second pressure receiving portion;

said first spool in said directional control valve is adapted to be brought to its neutral position by the first spring means to block fluid communication between one of said ports and another therein, to be brought to its first position under a fluid pressure applied to said first pressure receiving portion to establish fluid communication each between said pump port and said first actuator port and between said second actuator port and said tank port therein, and to be brought to its second position under a fluid pressure applied to said second pressure receiving portion to establish fluid communication each between said pump port and said second actuator port and between said first actuator port and said tank port therein; and said second spool in said pilot pressure applying valve is adapted to be brought to its neutral position by the second spring means to block fluid communication between said first port and said third port therein and to establish fluid communication each between said second port and said tank port and between said fourth port and said tank port therein, to be brought to its first position by said first drive means to establish a fluid communication each between said first port and said second port and between said fourth port and said tank port therein, and to be brought to its second position by said second drive means to establish a fluid communication each between said third port and said fourth port and between said second port and said tank port.

8. A hydraulic motor driving apparatus, as set forth in claim 3, in which:

said directional control valve comprises:

a valve body;

a first, large diameter spool bore formed in said valve body and formed with a pump port, a first actuator port, a second actuator port and a tank port; and a first, large diameter spool slidably inserted in said first, large diameter spool bore and having a first pressure receiving portion and a second pressure receiving portion at its two opposite sides, respectively;

said pilot pressure applying valve comprises:

the valve body;

a second, small diameter spool bore formed in said valve body and formed with a first port, a second port, a third port, a fourth port and a tank port; and a second, small diameter spool slidably inserted in said second, small diameter spool bore and adapted to be moved slidably in said second spool bore by the first and the second drive means;

fluid communication may be established, each between said first actuator port and said first port, between said second actuator port and said third port, between said second port and said first pressure receiving portion, and between said fourth port and said second pressure receiving portion;

said first spool in said directional control valve is adapted to be brought to its neutral position by the first spring means to block a fluid communication between one of said ports and another therein, to be brought to its first position under fluid pressure applied to said first pressure receiving portion to establish fluid communication each between said pump port and said first actuator port and between said second actuator port and said tank port therein, and to be brought to its second position under a fluid pressure applied to said second pressure receiving portion to establish fluid communication each between said pump port and said second actuator port and between said first actuator port and said tank port therein; and said second spool in said pilot pressure applying valve is adapted to be brought to its neutral position by the second spring means to block fluid communication between said first port and said third port therein and to establish fluid communication each between said second port and said tank port and between said fourth port and said tank port therein, to be brought to its first position by said first drive means to establish fluid communication each between said first port and said second port and between said fourth port and said tank port therein, and to be brought to its second position by said second drive means to establish a fluid communication each between said third port and said fourth port and between said second port and said tank port.

9. A hydraulic motor driving apparatus, as set forth in claim 2, which further comprises a pressure control means responsive to said directional control valve for causing the hydraulic pressure of the discharge fluid of said hydraulic motor to be lowered when said directional control valve is brought to said neutral position and said hydraulic pressure to be elevated when said directional control valve is switched to take said first or second position.

10. A hydraulic motor driving apparatus, as set forth in claim 2, in which:

said directional control valve comprises:

a valve body;

a first, large diameter spool bore formed in said valve body and formed with a pump port, a first actuator port, a second actuator port and a tank port; and a first, large diameter spool slidably inserted in said first, large diameter spool bore and having a first pressure receiving portion and a second pressure receiving portion at its two opposite sides, respectively;

said pilot pressure applying valve comprises:

the valve body;

a second, small diameter spool bore formed in said valve body and formed with a first port, a second port, a third port, a fourth port and a tank port; and a second, small diameter spool slidably inserted in said second, small diameter spool bore and adapted to be moved slidably in said second spool bore by the first and the second drive means;

fluid communication may be established, each between said first actuator port and said first port, between said second actuator port and said third port, between said second port and said first pressure receiving portion, and between said fourth port and said second pressure receiving portion;

said first spool in said directional control valve is adapted to be brought to its neutral position by the first spring means to block fluid communication between one of said ports and another therein, to be brought to its first position under a fluid pressure applied to said first pressure receiving portion to establish fluid communication each between said pump port and said first actuator port and between said second actuator port and said tank port therein, and to be brought to its second position under a fluid pressure applied to said second pressure receiving portion to establish fluid communication each between said pump port and said second actuator port and between said first actuator port and said tank port therein; and said second spool in said pilot pressure applying valve is adapted to be brought to its neutral position by the second spring means to block fluid communication between said first port and said third port therein and to establish fluid communication each between said second port and said tank port and between said fourth port and said tank port therein, to be brought to its first position by said first drive means to establish fluid communication each between said first port and said second port and between said fourth port and said tank port therein, and to be brought to its second position by said second drive means to establish a fluid communication each between said third port and said fourth port and between said second port and said tank port.

* * * * *